No. 615,922. Patented Dec. 13, 1898.
K. D. SUTHERLAND & T. W. MITCHEL.
VEHICLE TIRE.
(Application filed Aug. 30, 1897.)
(No Model.)

Witnesses
Harold H. Simms
V. B. Hillyard

Inventors
Kenneth D. Sutherland
Thomas W. Mitchel
by their Attorneys
C. A. Snow & Co.

UNITED STATES PATENT OFFICE.

KENNETH DONALD SUTHERLAND AND THOMAS WILLIAM MITCHEL, OF MONTREAL, CANADA, ASSIGNORS OF ONE-THIRD TO WILLIAM H. SUTHERLAND, OF SAME PLACE.

VEHICLE-TIRE.

SPECIFICATION forming part of Letters Patent No. 615,922, dated December 13, 1898.

Application filed August 30, 1897. Serial No. 650,043. (No model.)

*To all whom it may concern:*

Be it known that we, KENNETH DONALD SUTHERLAND and THOMAS WILLIAM MITCHEL, subjects of the Queen of Great Britain, residing at Montreal, in the county of Hochelaga and Province of Quebec, Canada, have invented a new and useful Vehicle-Tire, of which the following is a specification.

This invention has for its object to provide a non-inflatable tire for vehicle-wheels which will be elastic, capable of resisting puncture, and which may replace the ordinary inner tube of duplex tires to sustain the jacket or casing.

Further objects and advantages of this invention will appear in the following description, and the novel features thereof will be particularly pointed out in the appended claim.

Figure 1:
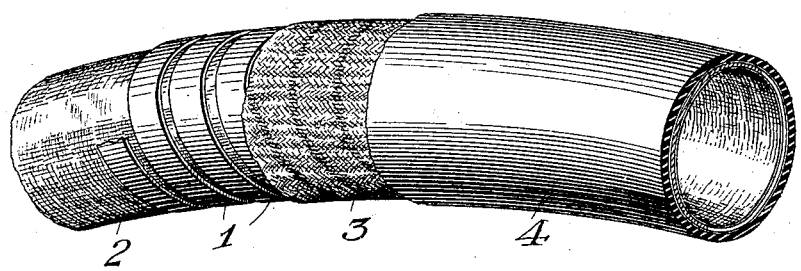
Figure 2:
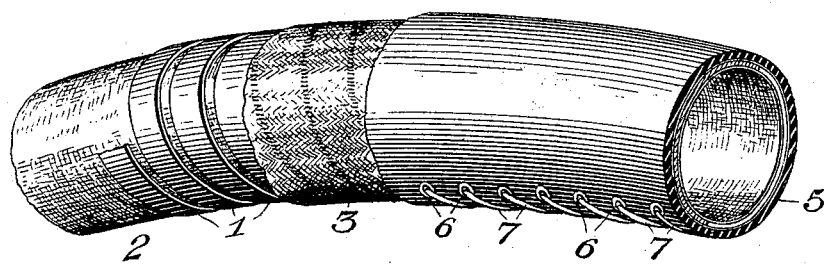
Figure 3:
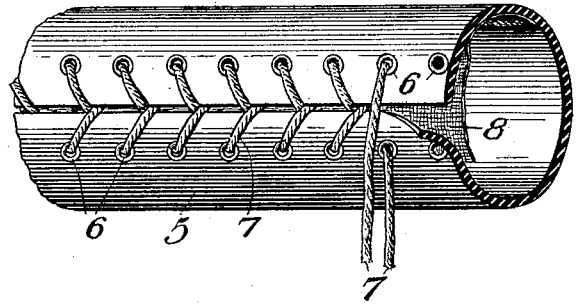

In the drawings, Figure 1 is a perspective view of a length of tube or tire embodying the essential features of this invention. Fig. 2 is a view similar to Fig. 1, showing an improved construction of jacket or casing. Fig. 3 is a detail view of a portion of the jacket or casing designed to receive the improved inner tube.

Similar numerals of reference indicate corresponding parts in all the figures of the drawings.

The tire embodying our invention comprises, essentially, an inner tube adapted to be substituted for the inner tube of a pneumatic duplex or double-tube tire and a jacket or casing for inclosing the inner tube and adapted to be secured in the tire-seat of a wheel-rim. As preferably constructed the inner tube, constituting the inner member of the tire embodying our invention, comprises a metallic spiral-spring coil 1, which is covered interiorly and exteriorly by inner and outer layers, plies, or tubes 2 and 3, of duck, canvas, textile, or other suitable material, which are cemented together between the convolutions of the coil and also to the opposite surfaces of such convolutions, rubber or equivalent cement being employed for this purpose. The outer layer or ply is preferably arranged bias with respect to the inner layer or ply to increase the strength of the article and prevent the distortion thereof when subjected to strains.

The metallic coil is of uniform diameter of the desired cross-sectional configuration, but preferably consists of a ribbon or strip of spring-steel, in that it affords an extended bearing-surface, a corresponding surface for the attachment of the inner and outer layers or plies, and also reduces the puncturable area of the tire.

As hereinbefore indicated, the above-described inner tube is adapted to be arranged within the jacket or casing of a pneumatic double-tube tire of the ordinary construction to maintain the latter in an expanded condition or to be arranged in such a relation to the members of a pneumatic tire as to take the place of a deflated tube of the ordinary construction when the latter has collapsed by reason of a puncture, a leaking valve, or any analogous casualty; also, the tube, as described, may be provided with a jacket or casing 4, as illustrated in Fig. 1, of rubber or the equivalent thereof, adapted to be seated upon the rim of a vehicle-wheel. Preferably, however, we construct the body portion of the tire, constituting the essential feature of our invention, as an independent article of manufacture and employ with it a separate casing or jacket 5, as shown in Figs. 2 and 3, the same being longitudinally open and provided at its side edges with eyelets for the reception of a lacing 7, this lacing being arranged at the inner side of the ring formed by the tire and therefore being adapted to be fitted in the seat of a wheel-rim, with the lacing protected by the rim, and also constituting a roughened surface to facilitate the fastening of the tire against creeping by means of cement arranged in the rim.

It is obvious that the exposed portions of the lacing 7 produce a roughened inner surface for the tire by which the cement is enabled to obtain a firm hold, and thus prevent displacement, and particularly to prevent creeping. The joint between the edges of the jacket or casing is covered at the inner surface of the latter by a shield 8, which is attached at one end to the jacket and is free at the other edge. This shield prevents contact of the inner tube with the inner portions of the lacing, as in the ordinary practice.

The inner tube, consisting of the spiral metallic coil, the inner and outer layers, plies, or tubes secured together and to the opposite surfaces of the coil, and the separate jacket, having a roughened inner surface to be seated in a wheel-rim, constitute a complete tire, which is adapted to operate efficiently in connection with bicycle and other vehicle wheels without inflation, as by the pumping of air thereinto, and hence it will be obvious that many of the disadvantages of an inflated tire may be avoided by the use of the described construction. The liability to puncture in a tire constructed as described is reduced to the minimum, and even should a puncture be caused the result is not the deflation of the tire, as the expansion thereof does not depend upon air pressure.

The inclosing jacket or casing 5 of the improved construction may be of either homogeneous or suitable composite material, such as canvas and rubber; but the layers, plies, or tubes 2 and 3, between which the resilient body portion of the inner tube is arranged, are preferably of canvas or textile material, secured to the coil by rubber or equivalent cement, which should be vulcanized to insure the efficient connection of the parts. It will be seen, furthermore, that we employ inner and outer layers or plies 2 and 3, which are of continuous tubular construction, with the object of sustaining or restraining the spring-coil and preventing the relative displacement of the convolutions thereof, and this restraining effect is vastly increased by the fact that the convolutions of the coil are separated sufficiently to enable us to secure a firm connection between said inner and outer layers by means of cement. Thus the several convolutions of the coil are held out of contact and there is little or no liability of displacement. The advantage in the arrangement of one of the layers on the bias will be apparent from the fact that we depend solely upon said inner and outer layers to maintain the convolutions of the coil in their operative positions, and it will be apparent, furthermore, that we employ layers of fabric, such as canvas, coated or saturated with cement, as possessing strength sufficient to maintain the convolutions of the coil in place and at the same time protecting the outer jacket or casing from contact with the coil.

Various changes in the form, proportion, and the minor details of construction may be resorted to without departing from the spirit or sacrificing any of the advantages of this invention.

Having described our invention, what we claim is—

The herein-described non-inflatable tire, comprising an inner tube consisting of a metallic spiral coil of which the convolutions are spaced apart, and inner and outer tubular layers or plies secured to the inner and outer surfaces of said coil, and also secured together in the intervals between the convolutions of the coil, and a separate exterior jacket or casing inclosing and snugly fitting the inner tube, and consisting of a transversely-folded layer provided at its edges with eyelets, and lacing rove through the eyelets and projecting beyond the exterior surface of the jacket or casing contiguous to the said joint, to present a roughened surface for contact with the seat in a vehicle-rim, substantially as specified.

In testimony that we claim the foregoing as our own we have hereto affixed our signatures in the presence of two witnesses.

KENNETH DONALD SUTHERLAND.
THOMAS WILLIAM MITCHEL.

Witnesses:
JOHN FORD,
W. L. HOWARD.